Dec. 5, 1939.  H. BRANDT  2,182,534

GYROSCOPE

Filed Dec. 9, 1937  2 Sheets-Sheet 1

INVENTOR.
Hermann Brandt
BY Stephen Cerstvik
ATTORNEY.

Dec. 5, 1939.   H. BRANDT   2,182,534
GYROSCOPE
Filed Dec. 9, 1937   2 Sheets-Sheet 2
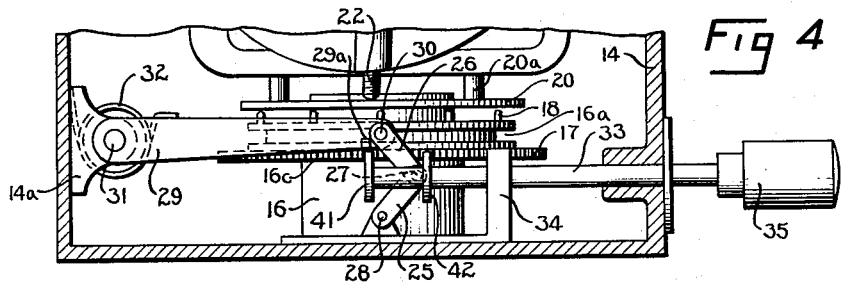
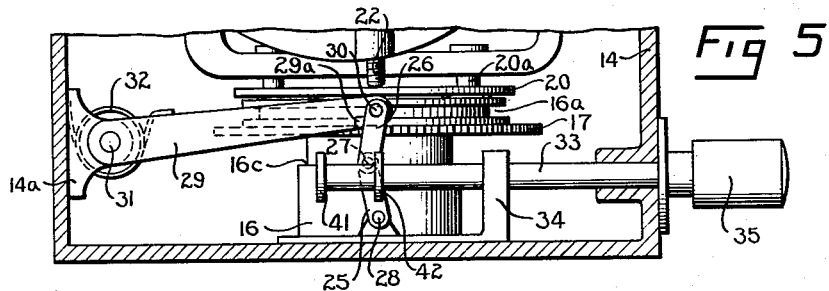
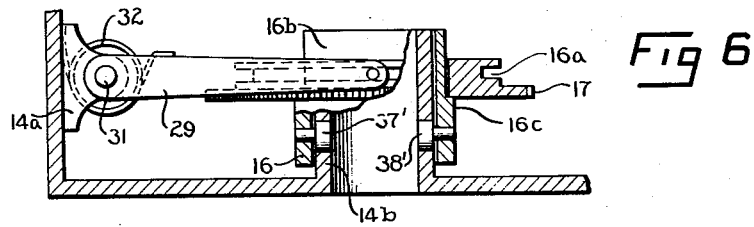
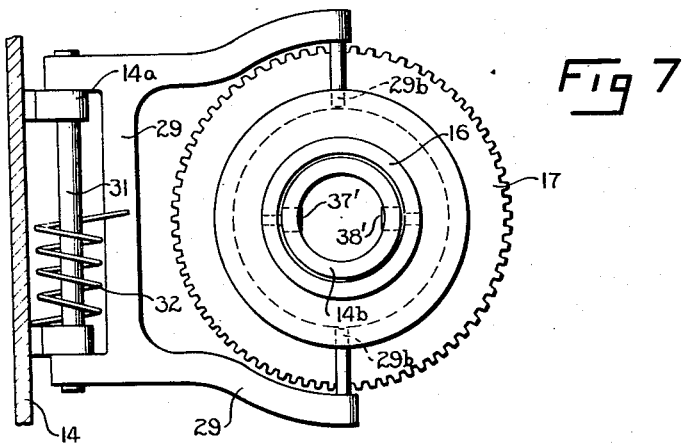
INVENTOR.
Hermann Brandt
Stephen Cerstvik
BY
ATTORNEY.

Patented Dec. 5, 1939

2,182,534

UNITED STATES PATENT OFFICE 2,182,534

GYROSCOPE

Hermann Brandt, Berlin, Germany, assignor to Siemens Apparate und Maschinen Gesellschaft mit beschrankter Haftung, Berlin, Germany, a corporation of Germany Application December 9, 1937, Serial No. 179,028
In Germany December 10, 1936

10 Claims. (Cl. 74—5)

This invention relates to gyroscopes and more particularly to directional gyroscopes adapted for axes adjustment.

When sudden changes in course or attitude are made in a vehicle, such as an aircraft provided with a directional gyroscope, it is often necessary, in order to prevent tumbling of the gyroscope, to hold the axes thereof in a fixed position. It also is often necessary to prevent the axes from tumbling during the process of readjustment of the direction indicator. The readjustment in azimuth of the direction indicator may be accomplished by a manually rotatable knob which, by suitable gear or clutch means, is connected to the Cardan ring mounting of the apparatus. This adjustment in azimuth must be made when the plane of rotation of the gyroscope is perpendicular and, therefore, when the axis of rotation is horizontal. If it is necessary to level the axis of rotation, a precessing moment will be produced which will tend to move the Cardan ring in azimuth. In order to avoid the effect of this disturbing moment, the ring must be clamped in a fixed position by suitable means before the axis of rotation is thus forced into the horizontal or levelled. Devices heretofore proposed for clamping the Cardan ring and for levelling the axis have been heavy and expensive in construction and large in size.

One of the objects of the present invention is to provide novel means which are light in weight and compact in size for fixing the position of the axes of a gyroscope.

Another object of the invention is to provide novel means for restraining movement of the axes of a gyroscope in predetermined directions.

A further object is to provide novel means for preventing a directional gyroscope from tumbling when sudden changes occur in the attitude of the vehicle upon which it is mounted.

The above and further objects and advantages will more fully appear hereafter in the detailed description which is to be read in connection with the accompanying drawings, wherein like reference characters refer to like parts throughout the several views, and wherein:

Fig. 4 is a side elevation of a third embodiment of the invention with the parts in the initial operating position;

Fig. 5 is a view of the embodiment shown in Fig. 4, with the parts in the final operating position;

Fig. 6 is a side elevation, partly in section and with parts cut away, showing a portion of one form of the clamping means; and, Fig. 7 is a top plan view of the parts shown in Fig. 6.

The form of the invention illustrated in the accompanying drawings, by way of example, is a device for clamping the Cardan ring mounting and leveling the axis of rotation of a gyroscope. The sequence of the operations must be in the order named in order to prevent tumbling of the gyroscope. The clamping and leveling means are constituted by a plunger mechanism which actuates a toggle joint which, in turn, transmits the thrust of the plunger upwardly to first lock the Cardan ring and then to level the axis of rotation.

Figure 1:
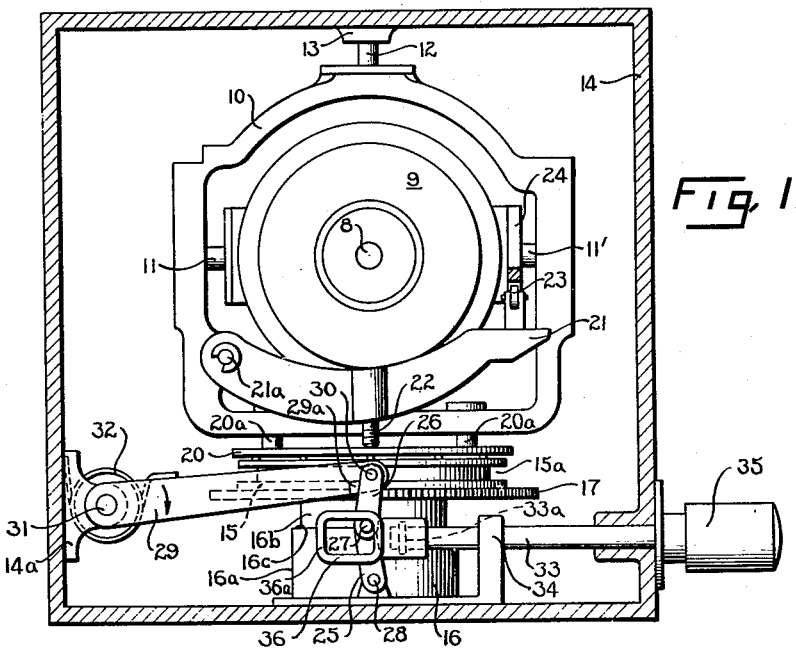
Fig. 1 is a side elevation of one embodiment of the invention.

In the form illustrated in Fig. 1, a gyroscope is mounted in the conventional manner and is adapted to act, for example, as a direction indicator. The gyroscope, rotating upon shaft 8, is mounted in a housing 9 upon a Cardan ring 10 by means of shafts 11, 11'. The Cardan ring, in turn, is mounted by means of a vertical shaft 12 in suitable bearings 13 upon the frame member 14.

Novel means are provided for clamping and preventing rotation of the Cardan ring 10 and for leveling, if necessary, the axis of rotation, comprising a locking device and a cam mechanism, both of which are actuated by means of a single plunger and toggle joint. The locking device which prevents rotation of the Cardan ring upon its vertical axis is constituted by a disc portion 15 having an annular groove 15a, said portion being rotatably mounted upon a cylindrical member 16 which is concentric with the vertical axis of the gyroscope and mounted upon frame 14. Cylinder 16 is composed of two portions 16a, 16b of differing diameters, the portion 16a having the larger diameter being at the base of the arrangement adjacent the frame 14. The upper periphery 16c of cylinder 16a constitutes a seat for disc 15 which, in addition to being rotatably mounted upon the upper cylinder 16b, is adapted for longitudinal displacement thereon. In order to provide an azimuth adjustment and to prevent the locking device from rotating except when undergoing adjustment, the disc 15 is rigidly attached to a concentric spur gear 17 meshing with suitable controlling gear means (not shown). The means for locking disc 15 and the Cardan ring 10 are constituted by a series of fingers 18, see Fig. 2, which extend upwardly from the top face of said disc and which are adapted for engaging bores 19 of a plate 20 which is secured to ring 10 by means of longitudinally displaceable bolts 20a which depend from said ring in suitable bores. Plate 20 is thus adapted for longitudinal displacement in cooperation with disc 15 but is not adapted for rotation relative to Cardan ring 10. It is pointed out that the locking engagement between disc 15 and plate 20 is completed when fingers 18 first enter bores 19 and that considerable longitudinal displacement of said disc is possible within the limits determined by the length of said fingers and of bolts 20a.

As above explained, the proper sequence of steps in the operation of the present device calls for first clamping or locking ring 10 and second for leveling and retaining in a leveled position the axis of rotation. The leveling mechanism comprises an arm 21 pivotally mounted upon ring 10 at 21a and adapted for motion in a vertical plane when an upward thrust of plate 20 is transmitted thereto by means of finger 22 attached to said arm. A roller 23 mounted upon arm 21 will engage a suitable cam 24 attached to shaft 11' to level, and retain in a leveled position, the axis of rotation when said arm has reached the upper limit of its motion as caused by plate 20. Said upper limit is not reached until after the Cardan ring has been locked by the engagement of disc 15 and plate 20.

Novel means are provided for longitudinally displacing disc 15 comprising a yoke which engages the groove of disc 15 and which is actuated by a toggle joint. The toggle joint is constituted by two bars 25 and 26 in pivotal connection at 27. Bar 25 is pivotally secured to frame 14 at 28 and bar 26 is drivably connected to a yoke 29 by a pin 30. Yoke 29, in turn, is pivotally secured to arms 14a upon frame 14 by means of a shaft 31. For reasons to be hereinafter set forth and in order to aid in the positive retaining of the toggle in the two extreme positions, i. e., the locked and unlocked positions, a turning moment is continuously applied to the yoke by means of a spring 32 to urge the same in the direction of the arrow. A limit stop 29a which may be integral with yoke 29 is provided for limiting the motion of bar 26 and for retaining the same in the locked position. It is evident that a pressure applied to the knee 27 of the toggle joint will be transmitted to the yoke 29 and thence to the locking disc 15 by means of inwardly extending fingers 29b see Fig. 7 attached to said yoke. The means provided for controlling the apparatus and for transmitting said pressure is constituted by a plunger 33 slidably mounted upon frame 14 and upon a support 34. Plunger 33 is longitudinally displaceable by means of a knob 35 attached to one end thereof and is adapted upon said displacement for engaging the knee pin 27. This engagement is accomplished in the form shown by means of a rectangular loop portion 36 operably attached to the plunger by means of an annular collar 33a which permits rotation of said plunger but compels loop 36 to follow therewith in longitudinal movement.

In order to avoid the disturbing effects of precessing moments which may occur if the axis of rotation and the Cardan ring are released in succession, means must be provided for enabling substantially a simultaneous release. In the toggle joint arrangement shown in Fig. 1, it is seen that, due to the conformation of the loop portion 36, a withdrawal of plunger 33 will not engage knee pin 27 until the outer section 36a of said loop is in contact with the pin. Upon further withdrawal, the clearance afforded by said loop will permit a swift snapping action of the toggle, which is resiliently urged by spring 32, and will cause a swift disengagement of the leveling and clamping means which, although not occurring simultaneously, takes place within such a short period that disturbing effects due to precessing moments, which exist when a single axis is free, are substantially avoided.

In order to insure a uniform contact between disc 15 and seat 16c and in order to permit a continuous automatic adjustment of the clearance between said disc and cylinder 16, the cylinder may be pivotally mounted, as shown in Fig. 6, upon an upwardly extending portion 14b of frame 14 by means of journals 37', 38'. Between portion 14b and cylinder 16 is a sufficient clearance to permit member 16 to move along the axes of said journals and to thereby automatically adjust itself to a free sliding engagement within disc 15. This pivotal connection also prevents scoring of the guiding surface 16b by the inner adjacent edges of disc member 15.

In operation, assume that the apparatus is in the disengaged position. Should it be necessary to clamp the Cardan ring and to level the axis of rotation in order to make an azimuth adjustment or to execute some sudden change in attitude of the vehicle, the plunger 33 is moved inwardly and the rectangular loop portion 36 attached thereto thrusts against the knee pin 27 of the toggle joint. The bent knee of said joint formed by bars 25 and 26 is straightened by this thrust and the longitudinal force applied by plunger 33 is transmitted as an endwise pressure which thrusts upwardly upon the yoke 29 against the counteracting turning moment of spring 32. As this motion proceeds, the entire locking arrangement is lifted from seat 16c by yoke fingers 29b which engage the annular groove 15a of the locking disc 15, lifting the same and causing the upwardly extending fingers 18 to lock Cardan ring 10 by engaging bores 19 of plate 20, a plurality of said bores extending around the circumference of plate 20. Following the locking of said ring in the above manner, the face of disc 15 contacts the lower face of plate 20 and moves the latter upwardly therewith. Arm 21 is finally caused to move in cooperation with the upward motion of the locking mechanism by means of downwardly extending finger 22 which actuates the leveling device by causing roller 23 to engage cam 24. The continued pressure against knee 27 will straighten the linkage and cause alignment of bars 25 and 26. Immediately thereafter, the resilient turning moment applied by spring 32 to the yoke 29 will cause the knee arrangement to be sprung rapidly into the final position against the limit stop 29a. The knee as shown in Fig. 1 now is bent slightly in a direction opposite to that of the initial position. When it is desired to disengage the locking and leveling mechanism, plunger 33 is moved in the opposite direction. The outer portion 36a of loop 36 will engage knee pin 27 and again bring the bars into alignment. Due to the clearance afforded by the open loop, a rapid snapping action of the toggle is permitted upon further withdrawal of plunger 33 and the locking and leveling process is substantially simultaneously reversed.

Figure 2:
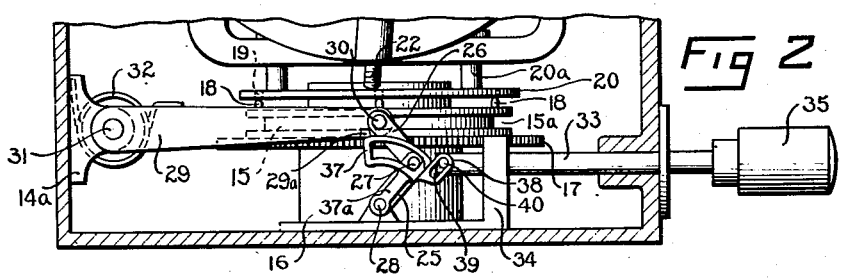
Fig. 2 is a side elevation illustrating a second embodiment of the invention with the parts in the initial operating position.
Figure 3:
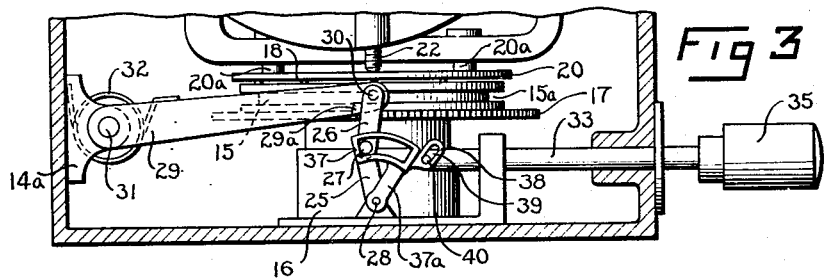
Fig. 3 is a view of the parts shown in Fig. 2 with the apparatus in the final position.

A second embodiment of the toggle joint means is shown in Figs. 2 and 3 which illustrate the disengaged and engaged positions, respectively. This form of the device is similar to the first with the exception that the portion 37 which connects plunger 33 and knee pin 27 instead of being formed as a rectangular loop is arcuate in shape and articularly connected, by means of a slotted portion 38 integral therewith, to said plunger. Arcuate portion 37 is pivotally mounted upon frame 14 by an arm 37a and pin 28 and provides a pathway for knee pin 27, giving sufficient free motion as determined by the limits thereof, to permit the free snapping action of the toggle joint. Slotted member 38 is provided with a slot 39 which is adapted for engaging a suitable pin 40 upon plunger 33, thus insuring an easily operable articulated connection therebetween.

The operation of this embodiment is similar to the first except for the action of the arcuate portion 37. Upon thrusting inwardly upon the plunger 33 when in the disengaged position, the pin 40 thereon engages the upper portion of slot 38 and causes member 37 to pivot upon pin 28 and to force knee pin 27 into the operative position as above explained. As the motion proceeds, pin 40 progressively moves downwardly in slot 39 until, at the lower limit thereof, the locked position of the mechanism is reached. A reversal of the process occurs as above set forth.

A third embodiment is illustrated in Figs. 4 and 5 also showing the apparatus in the disengaged and engaged positions, respectively. Actuation of the toggle joint in this form is accomplished by means of two parallel disc shaped elements 41 and 42 which may be rigidly mounted upon the extremity of plunger 33 such that, upon longitudinal displacement thereof, the disc elements will engage the knee pin 27. This embodiment provides a particularly simple construction and adapts the plunger for rotation in addition to longitudinal displacement. It is seen that the parallel disc elements 41 and 42 perform functions identical to the vertical portions of loop 36. The operation of the third embodiment is similar to that of the first embodiment.

There is thus provided a novel apparatus for controlling the Cardan ring and axis of rotation of a gyroscope. It is so constructed that tumbling or wandering of the gyroscope is prevented, for example, during the process of azimuth readjustment. It is positive in operation and rugged in construction employing a minimum of working parts. The mechanism is light in weight and adapted for installation within a limited space.

Although only three embodiments have been illustrated and described in detail, it is to be expressly understood that the invention is not limited thereto. For example, for the toggle joint means for lifting the yoke 29 may be substituted any linkage adapted for raising said yoke to the operative position and for rapidly releasing the same. Also for the manually operable plunger 33 may be substituted suitable servo-motor means for producing the force required to actuate the yoke lifting mechanism. There is shown, in the present embodiments, a torsion spring 32 which exerts a turning moment upon the yoke 29 and resiliently holds said yoke in the extreme positions. However, for this torsion spring, a suitable draw spring may be substituted. Various changes may also be made in the design and arrangement of the parts illustrated without departing from the spirit and scope of the invention, as the same will now be understood by those skilled in the art. For a definition of the limits of the invention, reference will be had primarily to the appended claims.

What is claimed is:

1. In apparatus for locking the Cardan ring and leveling the axis of rotation of a gyroscope, means for locking said ring in a predetermined direction and for leveling and fixing said axis of rotation, and toggle joint means for actuating said locking and leveling means.

2. In apparatus for locking the Cardan ring and leveling the axis of rotation of a gyroscope, a locking disc, a locking plate operably connected to said ring, means connected to said plate for leveling said axis, and toggle joint means for moving said disc and plate into coupling relationship.

3. In apparatus for locking the Cardan ring and leveling the axis of rotation of a gyroscope, means for first locking said ring, means for leveling said axis, toggle joint means for actuating said locking and leveling means, and resilient means for retaining said locking and leveling means in engaged and disengaged positions.

4. In apparatus for locking the Cardan ring and leveling the axis of rotation of a gyroscope, means for first locking said ring in a predetermined position and second for leveling said axis of rotation, toggle joint means for actuating said locking and leveling means, and limit stop means for said toggle joint.

5. In apparatus of the class described, a Cardan ring rotatable about a vertical axis, a locking disc, means for mounting said disc and for adapting same for displacement along said vertical axis, guiding surface means for said disc effective during said displacement, means attached to said ring adapted for engagement with said disc, and means for automatically adjusting the clearance between said disc and guiding surface during said displacement.

6. In apparatus of the class described, a gyroscope, a Cardan ring mounting for said gyroscope rotatable about a vertical axis, means mounting said gyroscope within said ring for rotation about a horizontal axis, a locking disc for said ring mounting, a cylindrical mounting for said disc coaxial with said vertical axis, said disc being adapted for axial displacement on said mounting, plate means concentric with said disc attached to said ring mounting, means for locking said plate and disc, means for leveling said gyroscope, and toggle joint means for actuating said locking disc and leveling means.

7. In a device of the character described, a fixed support, a vertical ring mounted for rotation about a vertical axis in said support, a gyro rotor mounted in said ring for oscillation about a horizontal axis, a vertically displaceable plate mounted on said ring, a disc spaced from said plate and mounted for movement vertically into contact with said plate, means resiliently urging said disc away from said plate, and toggle means connected to said last named means for actuating the same against the force of said spring, whereby said disc and plate are moved into contact.

8. In a device of the character described, a Cardan ring mounted for rotation about a vertical axis, a gyro rotor mounted in said ring for oscillation about a horizontal axis, vertically movable means for locking said ring about said vertical axis, and means for actuating said movable means comprising a toggle, an actuating element for said toggle, a hollow ring surrounding said toggle, and means for moving said ring into and out of contact with said actuating element, whereby said locking means are controlled.

9. In a device of the character described, a Cardan ring mounted for rotation about a vertical axis, and means for locking said ring about said axis, comprising a vertically movable plate, means including a pivoted link connected to said plate, a pin on said link, an accurate slotted link surrounding said pin and mounted for rotation about a fixed axis, means for actuating said slotted link, and lost-motion means connecting said actuating means and said link.

10. In a device of the character described, a Cardan ring mounted for rotation about a vertical axis, and means for locking said ring about said axis, comprising a vertically movable member, means including a pivoted link connected to said plate, a pin on said link, a slideable rod, a pair of spaced pistons mounted on said rod, and means for mounting said rod in such a manner that said pistons are located on opposite sides of said pin so that upon movement of said rod in either direction one of said pistons engages said pin to actuate the movable member.

HERMANN BRANDT.